United States Patent [19]
Kisaka

[11] Patent Number: 5,822,147
[45] Date of Patent: Oct. 13, 1998

[54] POSITION CONTROL APPARATUS AND METHOD WITH A DIGITAL FILTER AND A PHASE CHANGE FILTER SECTION IN A DISK STORAGE DEVICE

[75] Inventor: Masashi Kisaka, Yokohama, Japan

[73] Assignee: International Business Machines Corporation, Armonk, N.Y.

[21] Appl. No.: 648,586

[22] Filed: May 16, 1996

[30] Foreign Application Priority Data

Jun. 1, 1995 [JP] Japan ..................................... 7-135243

[51] Int. Cl.⁶ ..................................................... G11B 5/596
[52] U.S. Cl. ................................... 360/77.08; 360/77.02; 360/77.04
[58] Field of Search ............................. 360/77.02, 77.07, 360/77.08, 78.14, 77.05, 51, 77.04; 369/50, 44.32, 58

[56] References Cited

U.S. PATENT DOCUMENTS

| | | | |
|---|---|---|---|
| 4,890,170 | 12/1989 | Watt et al. | 360/77.04 |
| 5,402,280 | 3/1995 | Supino | 360/77.04 |
| 5,404,253 | 4/1995 | Painter | 360/77.04 |
| 5,550,685 | 8/1996 | Drouin | 360/77.08 |
| 5,585,976 | 12/1996 | Pham | 360/77.04 |

*Primary Examiner*—Andrew L. Sniezek
*Attorney, Agent, or Firm*—Joan Pennington

[57] ABSTRACT

A head position signal Y(N), which represents the size and direction of the deviation of the current position of a magnetic head to the target position in terms of a digital value, is input at intervals of sampling cycle TS. A main control section 68 generates and outputs a motor current control signal U(N) representative of a control amount of motor current in terms of a digital value. The main control section 68 is provided with a digital filter 86 so that the head position signal Y(N) is input. The digital filter 86 has a gain which becomes a peak with respect to the component of a frequency in a narrow band including a predetermined angular frequency $\omega_o$ and which becomes almost 0 with respect to the frequency components other than the narrow band. The main control section 68 is further provided with a phase change section 88, which delays the phase of the signal output from the digital filter 86 by 5 TS and outputs it, so that the signal whose phase was delayed is added to the motor current control signal U(N) through a summing point 74.

10 Claims, 15 Drawing Sheets

[NYQUIST DIAGRAM IN CONVENTIONAL MAGNETIC DISK DRIVE HAVING A DIGITAL FILTER]

PRIOR ART

POSITION CONTROL APPARATUS AND METHOD WITH A DIGITAL FILTER AND A PHASE CHANGE FILTER SECTION IN A DISK STORAGE DEVICE

FIELD OF THE INVENTION

The present invention relates to a position control apparatus and a position control method, and more particularly, to a position control method of controlling the position of a controlled object which is moved to a position corresponding to each position along the radial direction of a rotating body by an actuator and to a position control apparatus to which that position control method is applicable.

DESCRIPTION OF THE PRIOR ART

On the magnetic disk of a hard-disk drive, a plurality of concentric circular data tracks are formed and also identification data and burst patterns are recorded along the radial direction of the disk in advance. The identification data is data representative of a track address of each data track and, based on the identification data read out by the magnetic head, the approximate position of the magnetic head, i.e., which data track the magnetic head is positioned over can be determined. Also, the burst patterns are constituted by a plurality of burst pattern rows. Each burst pattern row consists of signal recorded areas which are arranged along the radial direction of the disk at predetermined intervals and which are different in phase. Based on a signal which is output according to the burst patterns from the magnetic head, the fine position of the magnetic head, i.e., what extent the position of the magnetic head is shifted from the data track that the magnetic head corresponds to can be detected.

When data is read from or written to the magnetic disk, at the state where the magnetic disk is being rotated, the magnetic head is moved and positioned over a specific data track, while determining the approximate position of the magnetic head, based on the identification data read out by the magnetic head. Then, the magnetic head is accurately positioned over the above-described specific data track, based on a signal which is output according to the burst patterns from the magnetic head (seek operation). Also, when data is being read out or written in, a feedback control is performed so that the magnetic head is positioned over the specific data track at a fixed position (track follow operation), based on a signal output from the magnetic head according to the burst patterns.

Incidentally, the magnetic disk of the hard-disk drive is mounted on the outer periphery of a spindle, which is rotated by a motor. In many cases, the center of the magnetic disk is slightly eccentric with respect to the axis of rotation of the spindle because of a manufacturing error and the like. This eccentricity acts as an external disturbance on a control system, which performs a feedback control so that the magnetic head is positioned over a specific data track at a fixed position.

In the feedback control system, a signal which is output according to the burst pattern from the magnetic head is used as a feedback element, and based on a control operation signal representative of a deviation between the position of the magnetic head to a data track obtained from the above-described signal and the target position of the magnetic head, the magnetic head position is controlled by generating and outputting a manipulation-amount signal with which the magnetic head position is matched with the target position. However, even if the magnetic head position could be matched with the target position, an external disturbance (referred to as a repetitive error) causing the above-described deviation to become a large value is added at intervals of predetermined cycle due to the above-described eccentricity, so the control system cannot follow the repetitive error and the shift of the magnetic head position to the target position often exceeds an allowable value. Because of this, there repeatedly occurs the error that part of a block of data read out of a data track is lost, or part of a block of data to be written to a data track cannot be normally written in.

In connection with the above, the applicant of the present invention has already proposed a rotary storage system (magnetic disk drive). In the disk drive, a digital filter, which has a high gain only at a component of a specific frequency (for example, 60 Hz) which is relatively low among the frequency components contained in the above-described control operation signal, is used, an input control operation signal is input to the digital filter, and a signal output from the digital filter is added to generate and output a manipulation-amount signal. In the magnetic disk drive, the magnetic head can be controlled in the track follow operation so that it always follows a data track, without changing other constitutional elements of the control system, by matching the above-described specific frequency with a frequency corresponding to the frequency of occurrence of the repetitive error (hereinafter referred to as simply a repetitive error frequency).

However, in the magnetic disk drive a repetitive error with a high frequency occurs because the bearing of the motor rotating the spindle is not a circle in addition to the eccentricity of the center of the magnetic disk to the axis of rotation of the spindle. Such repetitive error also becomes a problem when the pitch of the data tracks to be formed on the magnetic disk is made small (when the width of the data track is made narrow). On the other hand, if in the above-described magnetic disk drive the frequency, at which the gain of the digital filter becomes high, is made high, there will be the problem that the stability in the control system will be damaged.

FIG. 15 shows an example of a Nyquist diagram obtained with the closed loop transfer function of the control system of the above-described magnetic disk drive. The Nyquist diagram is the locus of a complex vector on a complex plane (Z plane) as an operator of Z conversion moves on a unit circle on the complex plane, but since the locus of the Nyquist diagram is symmetrical with respect to the real number axis, only one side is shown.

A sharp change (peak 120) in the locus of the Nyquist diagram is caused by the influence of the digital filter, and the stability of the control system can be determined to be high because the sharp change has occurred at a position spaced from a point of (−1, J0) on the complex plane. However, since the position at which the peak 120 occurs on the Nyquist diagram changes according to the value of the frequency at which the gain of the digital filter goes to high and since that peak position gets nearer to the point of (−1,J0) on the complex plane as that frequency goes to high, the stability of the control system can be determined to be reduced.

Thus, in the conventional magnetic disk drive, if the stability of the control system is taken into consideration, the frequency at which the gain of the digital filter goes to high will not be able to be set to a high frequency at which the locus of the Nyquist diagram will get near to the point of (−1, J0) on the complex plane. Therefore, in order that the stability of the control system is not damaged, the frequency at which the gain of the digital filter goes to high must be set to a relatively low frequency so that no locus of the Nyquist diagram gets near to the point of (−1, J0) on the complex plane.

The present invention has been made in view of the above facts.

SUMMARY OF THE INVENTION

A principal object of the present invention is accordingly to provide a position control apparatus and method which is capable of reliably controlling the position of a controlled object without damaging the stability of the control system, even when the frequency of a repetitive error is high.

The position control apparatus of the present invention for achieving the above object comprises detecting means for detecting a current position of an object to be controlled that corresponds to a radial position of a rotating body; signal outputting means responsive to the detecting means for receiving a target position of the object expressed in terms of the radial position of the rotating body and for outputting a control operation signal representative of a deviation between the current position detected by the detecting means and the input target position; and control means for controlling the movement of the object by an actuator, by generating and outputting a manipulation-amount signal for moving the object to a position corresponding to the target position, based on the control operation signal output from the signal outputting means. The control means includes filter means receiving the control operation signal having a gain becomes greater than a predetermined value only with respect to a component of a predetermined frequency included in the input control operation signal or the component of a frequency in a predetermined band including the predetermined frequency and the gain being zero or near zero with respect to the components of frequencies other than the predetermined frequency or the components of frequencies other than the predetermined band. The control means includes phase change means for changing a phase of a signal output from the filter means or a phase of the control operation signal which is input to the filter means. And, the control means is constructed so that output signals from transfer elements comprising the filter means and phase change means are added to the manipulation-amount signal.

Also, in the present invention, the rotating body may be a data recording medium where a plurality of concentric circular tracks are formed and where data can be recorded on each track, and the object to be controlled may be a head which is provided with at least a function of reading out the data recorded on the tracks of the rotating body.

Also, in the present invention, the data recording medium may be a magnetic disk of a hard-disk drive, and the head may be a magnetic head of the hard-disk drive which is provided with at least a function of reading out the data recorded on a track of the magnetic disk.

Also, in the present invention, the filter means may be a digital filter where a transfer function H(Z) expressed by Z conversion is $$H(Z) = \frac{Z^2 - 2R \cdot \cos(\omega_o TS)Z + R^2}{Z^2 - 2\cos(\omega_o TS)Z + 1} \cdot K \qquad \text{[Formula 5]}$$

where the detection cycle of the position of the object by the detecting means is TS and an angular frequency corresponding to the predetermined frequency is $\omega_o$, and R and K are constants, and the phase change means may be a filter where a transfer function D(S) expressed by Laplase transform is $$D(S) = e^{(-JDS)} \qquad \text{[Formula 6]}$$

where D is the delay time from an original system.

The position control method according to the present invention comprises the steps of detecting a radial position of a rotating body that an object to be controlled corresponds to, as a current position of the object to be controlled; based on a control operation signal representative of a deviation between the detected current position and a target position of the object expressed in terms of the radial position of the rotating body, generating a manipulation-amount signal for moving the object to a position corresponding to the target position; inputting the control operation signal to filter means, the filter means having a gain which becomes greater than a predetermined value only with respect to the component of a predetermined frequency included in an input signal or the component of a frequency in a predetermined band including the predetermined frequency and which becomes 0 or near 0 with respect to the components of frequencies other than the predetermined frequency or the components of frequencies other than the predetermined band; changing a phase of a signal output from the filter means and adding the changed signal to the manipulation-amount signal, or changing a phase of the control operation signal, inputting the changed signal to the filter means, and adding the signal output to the filter means to the manipulation-amount signal; and controlling the movement of the object by an actuator, with the manipulation-amount signal.

Also, in the method of the present invention, the filter means can be a digital filter where a transfer function H(Z) expressed by Z conversion is $$H(Z) = \frac{Z^2 - 2R \cdot \cos(\omega_o TS)Z + R^2}{Z^2 - 2\cos(\omega_o TS)Z + 1} \cdot K \qquad \text{[Formula 7]}$$

where the detection cycle of the position of the object by the detecting means is TS and an angular frequency corresponding to the predetermined frequency is $\omega_o$, and R and K are constants, and the change of the phase of the signal output from the filter means or the change of the phase of the control operation signal can be performed by a filter where a transfer function D(S) expressed by Laplase transform is $$D(S) = e^{(-JDS)} \qquad \text{[Formula 8]}$$

where D is the delay time from an original signal.

Operation

An example of the transfer function H(Z) of the digital filter in a narrow band, where its gain becomes extremely large value at the predetermined angular frequency $\omega_o$ (=$2\pi F_o$) and becomes approximately 0 at the other frequencies, is expressed by the following Equation (1).

[Formula 9]

$$H(Z) = \frac{(Z - R \cdot e^{(-J\omega_o TS)})(Z - R \cdot e^{(J\omega_o TS)})}{(Z - e^{(-J\omega_o TS)})(Z - e^{(J\omega_o TS)})} \cdot K \qquad (1)$$

$$= \frac{Z^2 - 2R \cdot \cos(\omega_o TS)Z + R^2}{Z^2 - 2\cos(\omega_o TS)Z + 1} \cdot K$$

where TS is the sampling time, and R and K are constants. In the narrow band digital filter defined by the above-described Equation (1), the value of H(Z) becomes infinite when the denominator is a 0 at a predetermined frequency $F_o$. Also, if the value of the constant K is changed, the gain of the digital filter in frequencies other than the predetermined frequency $F_o$ will change as shown in FIG. 2. If the value of the constant R is changed, the band width where the gain become large will change as shown in FIG. 3. For this reason, the zero point of H(Z) can be brought close to a pole and the value of H(Z) in frequencies other than the predetermined frequency $F_o$ can be made near 0, by making the value of the constant K small and setting the value of the constant R to a value near to 1.

On the other hand, in FIG. 4 there is conceptually shown an example of control elements for generating and outputting a manipulation-amount signal U(Z) based on an input control operation signal Y(Z), among the closed loop control system of the magnetic disk drive. FIG. 6 at (A) shows a Nyquist diagram obtained with the transfer function of a closed loop control system, which includes these control elements and an actuator (voice coil motor) moving the position of a head which is an object to be controlled. If, in FIG. 4, the control operation signal Y(Z) is replaced with the head position signal Y(N) representative of a deviation between the head current position to be detected at intervals of predetermined time and the head target position in terms of a digital value (n represents a signal at a certain point of time in a discrete time value system), and the manipulation-amount signal U(Z) is replaced with the control signal u(n) representative of an amount of the control of the actuator moving the head, the control elements shown in FIG. 4 will be expressed by the following Equation (2)

$$U(N) = 0.259Y(N) + (-0.190)Y(N-1) + \quad (2)$$
$$0.00779I(N) + 1.595U(N-1) + 0.336U(N-2)$$

$$I(N+1) = I(N) + Y(N) \quad (2)$$

When the transfer function V(Z) of the voice coil motor is

[Formula 10]
$$V(Z) = \frac{0.785Z^2 + 7.27Z + 1.77}{Z(Z-1)^2} \quad (3)$$

and the operation frequency of the control system including the control elements shown in FIG. 4 (sampling frequency FS) is 4 KHz, consider a case (FIG. 5) where, to these control elements, there has been added a transfer element (digital filter of narrow band) 110 having a transfer function which is equal to the transfer function H(Z) where, in the above-described Equation (1), R is 0.95, K is −0.01, and $\omega_o$ is a relatively high value (for example, $\omega_o = 2\pi F_o$, $F_o = 200$ Hz).

If the characteristic root of the transfer function in the closed loop control system including the control elements shown in FIG. 5 is checked, it has been found that this closed loop control system is unstable. In other words, a Nyquist diagram, obtained with the transfer function of the closed loop control system including the control elements of FIG. 5, becomes as shown by broken lines (D=0), the case of not changing a phase in (B) of FIG. 6. Note that (B) of FIG. 6 is an enlarged diagram showing an enclosed by two-dot chain line of (A) of FIG. 6, and the locus in an area other than the enclosed area is identical with that of (A) of FIG. 6.

The locus of these broken lines goes from the second quadrant toward the real number axis in accordance with the change of Z and crosses the real number axis. After the locus goes into the third quadrant, it crosses the real number axis again and returns to the second quadrant. In the second quadrant the locus goes toward an infinite point. Then, the locus goes from the infinite point of the third quadrant toward the real number axis and crosses the real number axis. After the locus goes into the second quadrant, it terminates on the real number axis, surrounding a point of (−1, J0). Also, the locus (not shown) going from the infinite point of the second quadrant toward the infinite point of the third quadrant turns counterclockwise, as shown by arrow C in FIG. 6 at (B).

The reason that the locus of Nyquist diagram becomes a locus which goes toward an infinite point and then returns, as described above, is that the addition of the digital filter 110 increases the number of the poles (unstable poles) of the transfer function. When the number of the poles of the transfer function is increased, it is necessary to increase the number that the locus of the Nyquist goes round the point of (−1, J0) on the complex plane in order for the operation of the closed loop control system to be stable. In the locus shown by broken lines in FIG. 6 at (B), the point of (−1, J0) on the complex plane is not surrounded by an infinite circle including the above-described locus going from an infinite point toward an infinite point, and the number that the locus of the Nyquist goes round the point of (−1, J0) on the complex plane is not increased. Therefore, the operation of the closed loop control system including the control elements shown in FIG. 5 can be decided to be unstable.

If, on the other hand, the sign of the constant K in Equation (1) is made minus, in FIG. 6 at (B) the locus going from the infinite point of the second quadrant to the infinite point of the third quadrant will go in the opposite direction (clockwise direction). Therefore, the point of (−1, J0) on the complex plane is surrounded by an infinite circle, and the number that the locus of the Nyquist goes round the point of (−1, J0) on the complex plane is increased. However, since the locus going toward an infinite point passes a position relatively near to the point of (−1, J0) on the complex plane, the above-described locus will easily cross the point of (−1, J0) on the complex plane and the operation of the closed loop control system will tend to become unstable, if the characteristic of the voice coil motor changes.

Hence, the inventor of this application aims at the point that a narrow band filter has hardly an influence on the entire closed loop control system because the gain of the filter is near 0 at frequencies other than a predetermined angular frequency $\omega_o$ where the gain becomes maximum, and predicts that there is the possibility that the system operation will become stable if the phase of a signal passed through the filter is changed. In view of these, the present invention has been made.

Accordingly, the position control apparatus of the present invention comprises control means for controlling the movement of a controlled object by an actuator, by outputting a manipulation-amount signal for moving the object to a position corresponding to the target position, based on the control operation signal output from the control operation signal outputting section. The control means includes filter means where its gain becomes greater than a predetermined value only with respect to the component of a predetermined frequency included in the input control operation signal or the component of a frequency in a predetermined band including the predetermined frequency and becomes 0 or near 0 with respect to the components of frequencies other than the predetermined frequency or the components of frequencies other than the predetermined band, and also includes phase change means for changing a phase of a signal output from the filter means or a phase of the control operation signal which is input to the filter means. And, the control means is constructed so that output signals output from transfer elements comprising the filter means and phase change means are added to the manipulation-amount signal.

The digital filter of the transfer function expressed by Equation (1) can be used as filter means. Also, it is preferable that the phase change means have a characteristic which does not have an influence on the gain and changes only the phase. The transfer function (transfer function D(S) expressed by Laplase transform) of a typical filter having a characteristic such as this is

[Formula 11]

$$D(S) = e^{(-JDS)} \quad (4)$$

where D is the delay time from an original system. For example, if the control elements shown in FIG. 4 are provided with the filter means of the transfer function expressed by Equation (1) so that the control operation signal is input to the filter means and are provided with the phase change means (filter) of the transfer function expressed by Equation (4) so that the signal output from the filter means is input to the phase change means, the control elements will be conceptually constructed as shown in FIG. 1.

And, if the Nyquist diagram of the closed loop control system including the above-described control elements is obtained when the delay time, D, of the phase change means is set, for example, to 3TS, 4TS, and 5TS (integer times a sampling time TS), the Nyquist diagram will change as shown in FIG. 6 at (B), as the delay time D changes. Note that in FIG. 6 at (B), a case of the delay time D=3TS is shown by one-dot chain line, a case of the delay time D=4TS is shown by two-dot chain line, and a case of the delay time D=5TS is shown by solid line.

As evident in FIG. 6 at (B), the locus as the delay time D is set to 3TS, 4TS, and 5TS, as in the case of the control elements of FIG. 5 where the phase change means is not provided, becomes a locus which approaches the real number axis from the second quadrant, in accordance with the change of Z, goes toward an infinite point once, and then returns from the infinite point. However, the position of the infinite point is different from a case where the phase change means is not provided, and in every case, the point of (−1, J0) on the complex plane is surrounded by an infinite circle. Therefore, for the locus of the Nyquist diagram of the position control apparatus according to the present invention, the number that the locus of the Nyquist goes round the point of (−1, J0) is increased, so the operation of the position control apparatus according to the present invention can be decided to be high in stability.

Thus, in the present invention, by changing a change amount of a phase that is caused by the phase change means, the locus of the Nyquist diagram can be changed without damaging the stability of the control system, independently of the high and low of a frequency where the gain of the filter means becomes more than a predetermined value, more specifically, even in the case of a high frequency where the locus of the Nyquist diagram will go near the point of (−1, J0) on the complex plane. Therefore, the present invention can reliably control the position of a controlled object without damaging the stability of a control system, even when the frequency of a repetitive error is high and a frequency where the gain of the filter means becomes more than a predetermined value is matched with the frequency of the repetitive error. Also, the present invention can be realized only by providing the filter means and the phase change means in an existing control section, so there is no necessity of largely changing the construction of the control section.

Also, in the present invention, the rotating body may be a data recording medium where a plurality of concentric circular tracks are formed and where data can be recorded on each track, and the object to be controlled may be a head which is provided with at least a function of reading out said data recorded on said tracks of said rotating body. Also, the data recording medium may be a magnetic disk of a hard-disk drive, and the head may be a magnetic head of said hard-disk drive which is provided with at least a function of reading out said data recorded on a track of said magnetic disk.

The position control method according to the present invention comprises the steps of, based on a control operation signal, generating a manipulation-amount signal for moving said object to a position corresponding to said target position; inputting said control operation signal to filter means, the filter means having a gain which becomes greater than a predetermined value only with respect to the component of a predetermined frequency included in an input signal or the component of a frequency in a predetermined band including said predetermined frequency and which becomes 0 or near 0 with respect to the components of frequencies other than said predetermined frequency or the components of frequencies other than said predetermined band; changing a phase of a signal output from said filter means and adding the changed signal to said manipulation-amount signal, or changing a phase of said control operation signal, inputting the changed signal to said filter means, and adding the signal output to said filter means to said manipulation-amount signal; and controlling the movement of said object by an actuator, with said manipulation-amount signal. Accordingly, as with the above-described case, the position of an object to be controlled can be reliably controlled without damaging the stability of the control system, even when the frequency of the repetitive error is high.

Note that in the position control method, the digital filter of the transfer function expressed by Equation (1) can also be used as filter means, and the phase change of the signal output from the filter means or the phase change of the control operation signal can be performed by the filter of the transfer function expressed by Equation (4) (where D is the delay time from the original signal).

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

A preferred embodiment of the present invention will hereinafter be described in detail with reference to the accompanying drawings. Note that the present invention is described with certain numerical values but not limited to the numerical values described hereinafter.

Figure 7:
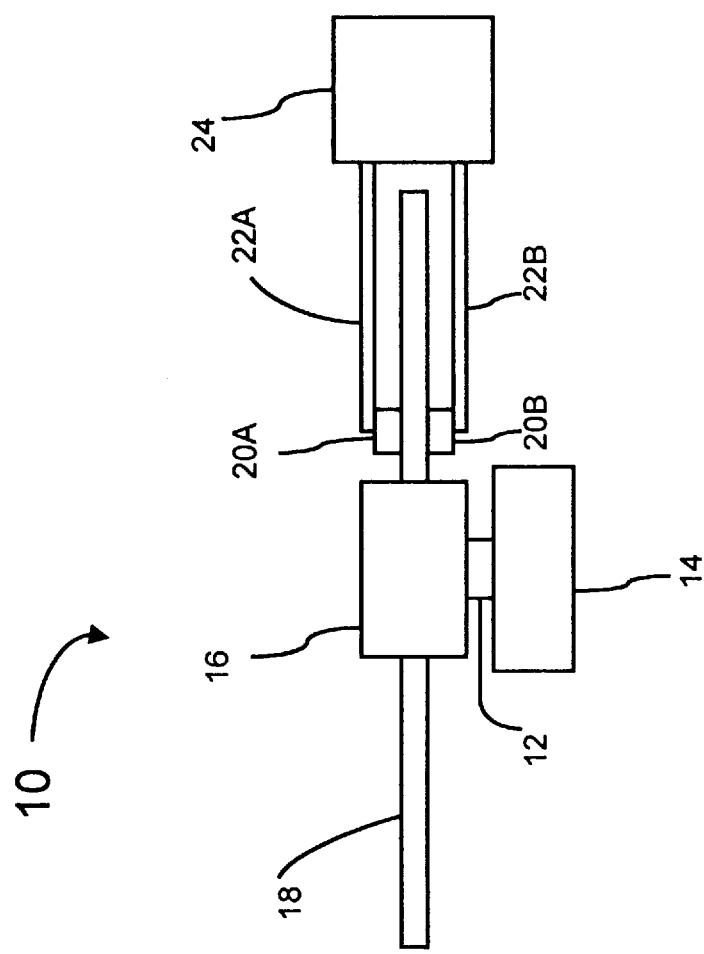
FIG. 7 is a schematic view showing a hard-disk drive according to an embodiment of the present invention.

FIG. 7 shows a hard disk drive 10 of this embodiment. The hard disk drive 10 is provided with a drive unit 14, which will spin a shaft 12 at constant high speed if power is applied. The shaft 12 has attached thereto a cylindrical spindle 16 so that the axes thereof are vertically aligned with each other. On the outer peripheral surface of the spindle 16 there are mounted a disk 18.

The disk 18 has a disk shape with a predetermined thickness dimension and is formed with hard material. Both sides of the disk are coated with magnetic material and used as recording surfaces. The central portion of the disk 18 is formed with a hole having the substantially same diameter as the outer diameter of the spindle 16. The spindle 16 is inserted into the center hole of the disk 18, and the disk 18 is fixed to the outer peripheral surface of the spindle 16. Therefore, if power is applied to the hard disk drive 10 and the shaft 12 is rotated by the drive unit 14, then the disk 18 will be rotated together with the spindle 16.

Figure 8:
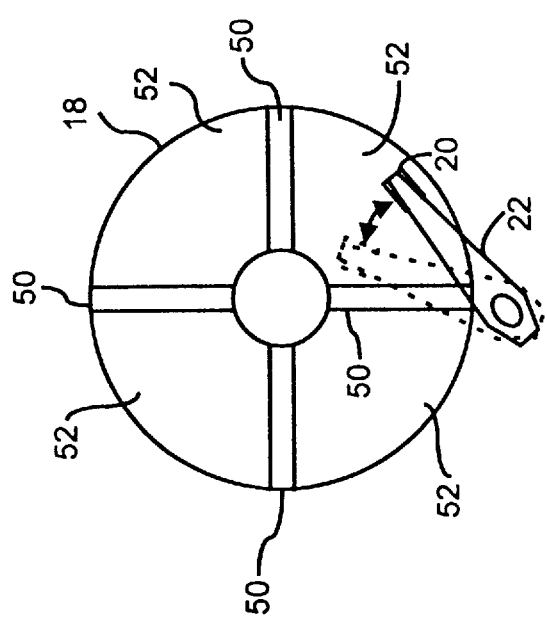
FIG. 8 is a plan view of the disk showing burst pattern recorded areas.
Figure 9:
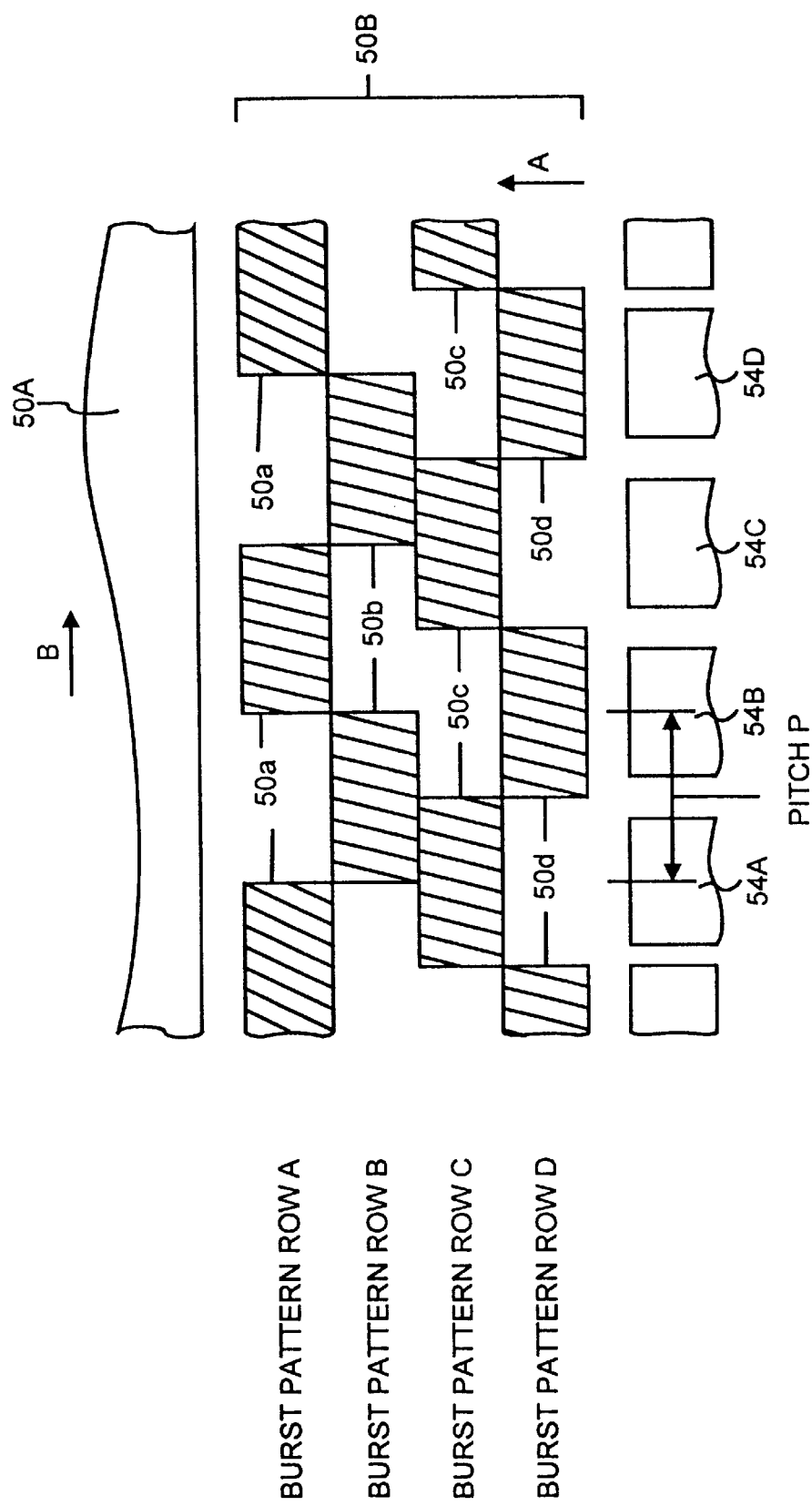
FIG. 9 is a plan view showing the data track and the burst pattern to be recorded on the burst pattern recorded area.

On each recording surface of the disk 18 a plurality of position detection data recorded areas 50 are radially formed along the radial direction of the disk 18, as shown in FIG. 8. On the remaining areas there are formed a plurality of data track areas 52. In FIG. 9 there are shown a portion of the position detection data recorded area 50 and a portion of the data track area 52. On the data track area 52 a plurality of data tracks are concentrically formed at intervals of pitch P, and FIG. 9 shows the data tracks 54A to 54C. Data is written to or read from each data track 54 along the circumferential direction (indicated by arrow A in FIG. 9) of the disk 18 with a magnetic head to be described later.

On the other hand, on the position detection data recorded area 50 there are provided a track identification data recorded area 50A and a burst pattern recorded area 50B. On the track identification data recorded area 50A, track identification data, which represents the track address of each data track in Gray code (cyclic binary code) in correspondence with each data track 54, is recorded. Also, on the burst pattern recorded area 50B there are formed burst patterns. As shown in FIG. 9, the burst patterns consist of four burst pattern rows (burst pattern rows A to D) where signal recorded areas (hatched portions in FIG. 9) are arranged in the direction of the arrangement of the data track 54, i.e., along the radial direction of the disk 18. The length of each signal recorded area in the radial direction of the disk 18 and the space between adjacent signal recorded areas are equal to the pitch P between adjacent data tracks.

The signal recorded areas 50a of the burst pattern row A and the signal recorded areas 50b of the burst pattern row B are arranged in a zigzag manner along the radial direction of the disk 18, and the both ends of each signal recorded area in the radial direction of the disk correspond to the centers of the data tracks 54 in the width direction thereof. The burst pattern rows A and B are formed by recording a signal on each area. The signal recorded areas 50c of the burst pattern row C and the signal recorded areas 50d of the burst pattern row D are arranged in a zigzag manner along the radial direction of the disk 18, and the both ends of each signal recorded area in the radial direction of the disk correspond to the boundary between adjacent data tracks in the radial direction. The burst pattern rows C and D are formed by recording a signal on each area.

Also, as shown in FIG. 7, the hard-disk drive 10 further includes magnetic heads 20A and 20B provided in correspondence with the recording surfaces of the disk 18. Each of the magnetic heads 20A and 20B includes a read element (not shown) which reads data from the recording surface with an MR element and also includes a write element (not shown) which writes data to the recording surface with a coil. The magnetic head 20A is mounted on one end of an access arm 22A and held in a position slightly (for example, about 0.1 to 0.2 microns) spaced from the corresponding record surface of the disk 18. Likewise, the magnetic head 20B is mounted on one end of an access arm 22B and held in a position slightly (for example, about 0.1 to 0.2 microns) spaced from the corresponding record surface of the disk 18. The other ends of the access arms 22A and 22B are mounted on a drive unit 24.

The drive unit 24 includes voice coil motors 26 (see FIG. 10) which are provided in correspondence with the access arms 22A and 22B to move the arms. If the voice coil motors 26 are driven by a micro processing unit to be described later, the access arms 22A and 22B will be moved so that the magnetic heads 20A and 20B move along the radial direction of the disk 18. With this arrangement, the magnetic heads 20A and 20B can be positioned over desired positions on the recording surfaces of the disk 18.

Figure 10:
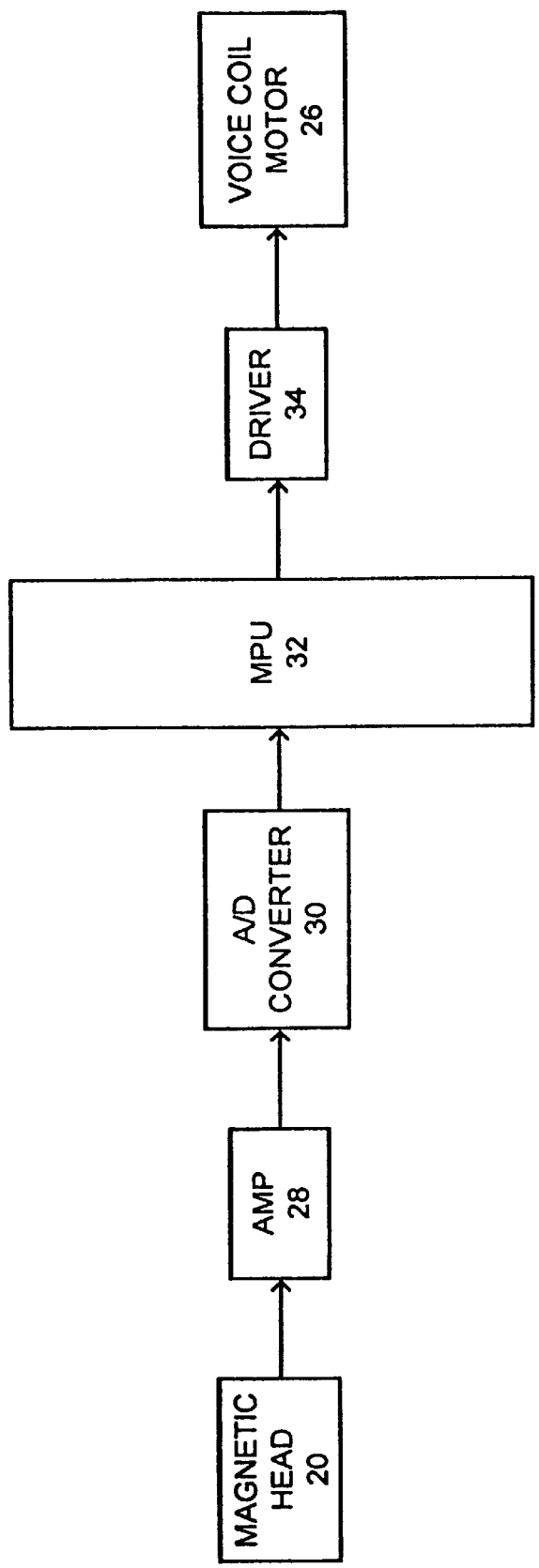
FIG. 10 is a block diagram showing the MPU and magnetic head of the hard-disk drive and the relationship of connections of the periphery.

The magnetic heads 20A and 20B are connected to each of the circuits shown in FIG. 10. That is, the signal output terminal of the magnetic head 20 is connected to the input terminal of an amplifier 28 so that the signal output from the read element of the magnetic head 20 is amplified with the amplifier 28. The output terminal of the amplifier 28 is connected to the input terminal of an analog-digital (A/D) converter 30. The output terminal of the A/D converter 30 is connected to the signal input terminal of a micro processing unit (MPU) 32, so the analog signal output from the amplifier 28 is converted into a digital signal with the A/D converter 30 and output to the MPU 32.

The MPU 32 decides the position of the magnetic head 20, based on the signal input from the A/D converter 30. According to the deviation between the decided position of the magnetic head 20 and the target position of the magnetic head 20, the MPU 32 generates a digital signal for controlling the position of the magnetic head 20 (more specifically, motor current control signal for controlling a current passing through the voice coil of the voice coil motor 26), as will be described later, and outputs the digital signal to a driver 34 connected to the MPU 32. Based on the input signal, the driver 34 controls a current passing through the voice coil of the voice coil motor 26. With this arrangement, the magnetic head 20 is moved so that the position of the magnetic head 20 matches with the target position.

Figure 11:
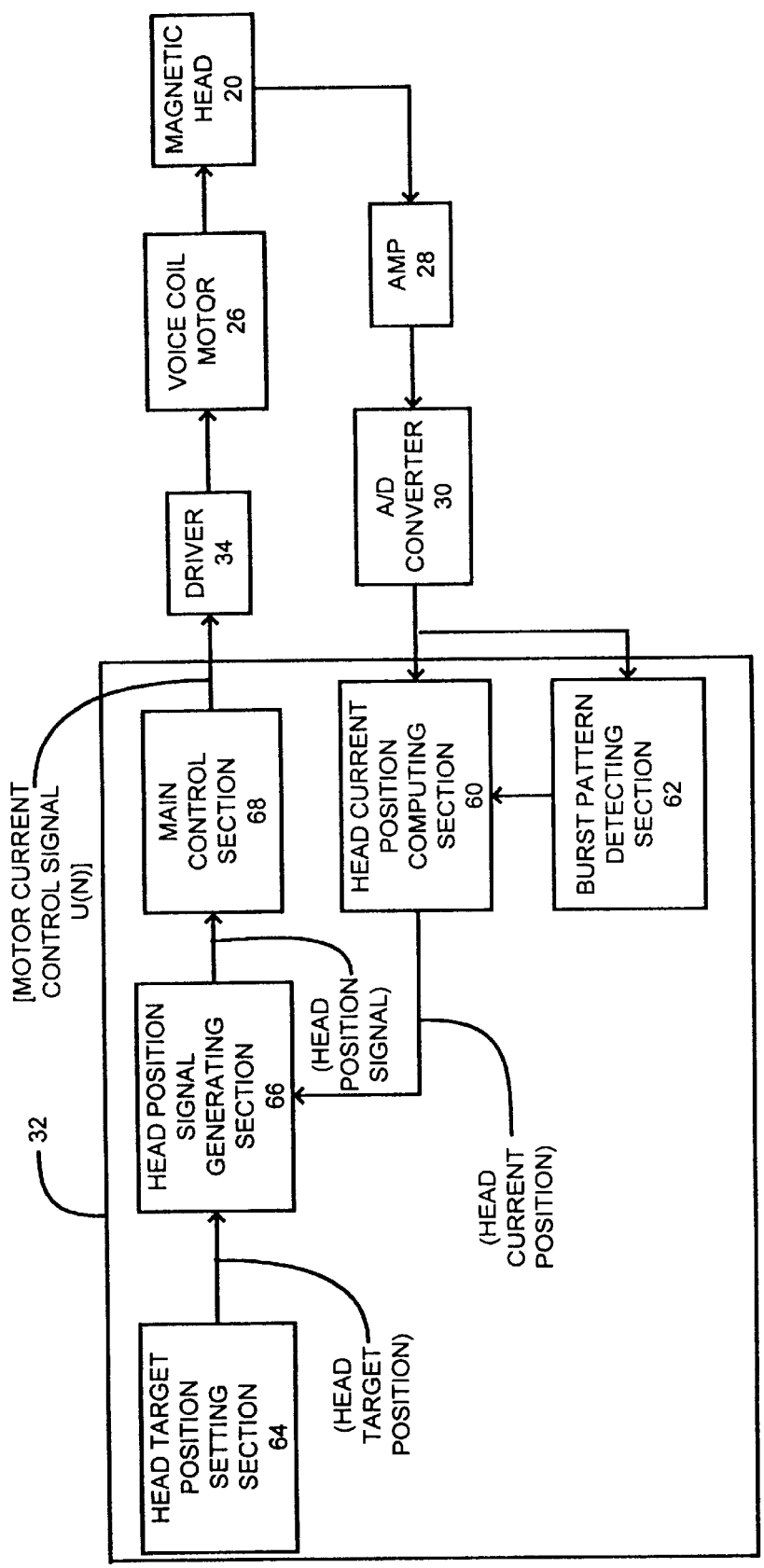
FIG. 11 is a functional block diagram showing each function of a control system for controlling the magnetic head so that the position of the head can follow the data track, in the MPU.

The operation of this embodiment will be described. In FIG. 11, among various functions the MPU 32 has, there is shown each function of a control system for realizing functions which control the position of the magnetic head 20 so that the position of the magnetic head can follow a position corresponding to a predetermined data track 54 (track follow operation) during the period of time that data is being written to or read from a data track with the magnetic head 20.

The signal output from the A/D converter 30 is input to a head current position computing section 60 and a burst pattern detecting section 62. The burst pattern detecting section 62 decides if the magnetic head 20 corresponds to the burst pattern recorded area 50B, based on the input signal, and outputs the result of the decision to the head current position computing section 60. The head current position computing section 60 fetches a signal from the A/D converter 30, when the magnetic head 20 is decided to correspond to the burst pattern recorded area 50B by the burst pattern detecting section 62. Based on that signal from the A/D converter, the head current position computing section 60 computes and outputs a position along the radial direction of the disk 18 that the magnetic head 20 currently corresponds to, i.e., the current position of the magnetic head 20. Therefore, from the head current position computing section 60, the head current positions are output at intervals of predetermined cycle (sampling cycle, TS).

Also, a head target position setting section 64 sets and outputs the target position of the magnetic head 20 which is expressed in terms of a position along the radial direction of the disk 18. When there is an offset or shift of the longitudinal center position of each of the gaps corresponding to the read and write elements of the magnetic head 20, the head target position setting section 64 sets and outputs values which are different between the time that data is read from the data track 54 and the time that data is written to the data track 54, as a target position of the magnetic head 20. For example, when data is read out, one value is set and output so that the center of the gap of the read element is aligned with the center of the data track 54, and when data is written in, another value is set and output so that the center of the gap of the write element is aligned with the center of the data track 54.

The head current position output from the head current position computing section 60 and also the head target position output from the head target position setting section 64 are input to a head position signal generating section 66. The head position signal generating section 66 compares the input head current position and head target position, and outputs a head position signal Y(N) which represents the size and direction of the deviation of the head current position to the head target position (whether the head current position with respect to the head target position is shifted toward the inner circumferential side or outer circumferential side of the disk 18) in terms of a digital value, at intervals of sampling cycle TS.

Note that the head position signal Y(N) corresponds to the control operation signal of the present invention. The burst pattern detecting section 62 and the head current position computing section 60 correspond to the detecting means of the present invention. The head position signal generating section 66 corresponds to the signal outputting means of the present invention.

Figure 12:
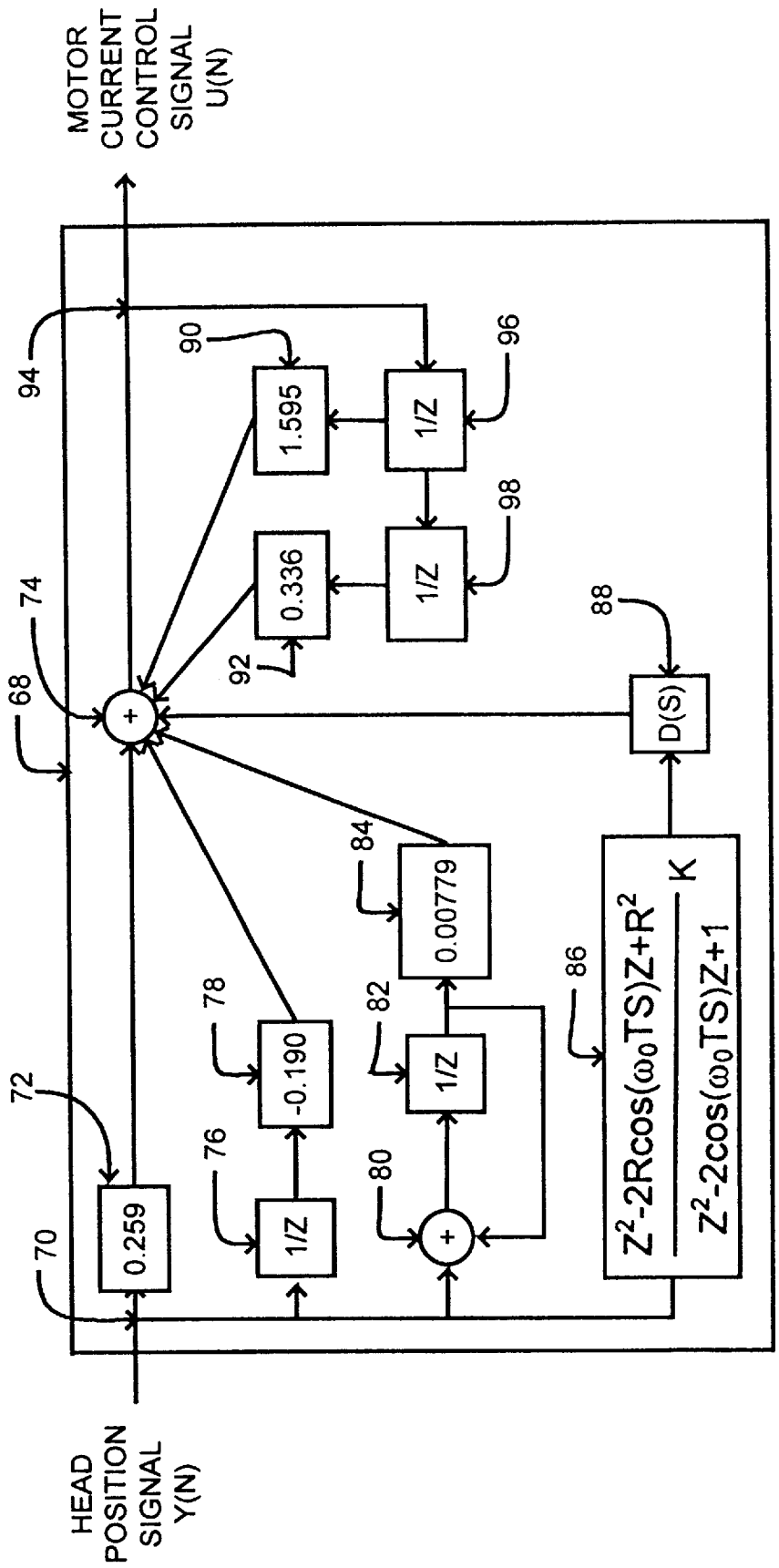
FIG. 12 is a block diagram showing an example of the main control section conceptually from the relationship between the input and output which are generated by the processing performed in the main control section.

The head position signal Y(N) output from the head position signal generating section 66 is input to a main control section 68, which corresponds to the control means of the present invention. FIG. 12 shows the processing of the main control section 68 conceptually from the relationship between the input and output generated by that processing.

As shown in FIG. 12, the head position signal Y(N) is input to a transfer element 72 where the transfer function (ratio of Z conversion between output and input signals) is 0.259, through an outgoing point 70. The signal output from the transfer element 72 is input to a summing point 74. Also, the head position signal Y(N) is input to a one-sample delay element 76 where the transfer function is 1/Z, through the outgoing point 70. The signal output from the one-sample delay element 76 is input to a transfer element 78 where the transfer function is −0.190. The signal output from the transfer element 78 is input to the summing point 74.

Also, the head position signal Y(N) is input to a summing point 80 through the outgoing point 70, and the signal output from the summing point 80 is input to a one-sample delay element 82 where the transfer function is 1/Z. The signal output from the one-sample delay element 82 is input to the summing point 80 and to a transfer element 84 where the transfer function is 0.00779. The signal output from the transfer element 84 is input to the summing point 74. Further, the head position signal Y(N) is input to a transfer element 86 where the transfer function is equal to the above-described Equation (1) (in this embodiment, constant R=0.95, constant K=−0.01), through the outgoing point 70. The transfer element 86 corresponds to the filter means of the present invention and will hereinafter be referred to as a digital filter 86.

Note that in the transfer function of the digital filter 86, a value corresponding to the frequency ($F_o$) of the repetitive error is set as the angular frequency $\omega_o$ of Equation (1). The repetitive error is caused due to the eccentricity of the center of the disk 18 to the center of rotation of the spindle 16 and the deformation of the disk 18, and by reason that the bearing of the motor for rotating the spindle 16 is not a true circle. In general, the frequency of this repetitive error becomes integer times a frequency corresponding to the speed of rotation of the disk 18. For this reason, the frequency of the repetitive error can be easily predicted based on the speed of rotation of the disk 18. In this embodiment, the angular frequency is $\omega_o=2\pi F_o$ and $F_o$ is 200 Hz.

The signal output from the digital filter 86 is input to a transfer element 88 where the transfer function is equal to the above-described Equation (4) (in this embodiment, delay time D=5·TS). The transfer element 88 corresponds to the phase change means of the present invention and will hereinafter be referred to as a phase change section 88. The signal output from the phase change section 88 is input to the summing point 74. Also, the signal output from a transfer element 90 having a transfer function of 1.595 and the signal output from a transfer element 92 having a transfer function of 0.336 are input to the summing point 74.

A signal corresponding to the sum of the signals, which were input from the transfer elements 72, 78, and 84, the phase change section 88, and the transfer elements 90 and 92, is output from the summing point 74. The signal output from the summing point 74 is output as a motor current control signal U(N) from the main control section 68, through an outgoing point 94. The motor current control signal u(n) corresponds to the manipulation-amount signal of the present invention and represents a control amount of motor current in terms of a digital value. The signal output from the summing point 74 is also input to a one-sample delay element 96 where the transfer function is 1/Z, through the outgoing point 94. The signal output from the one-sample delay element 96 is input to the above-described transfer element 90 and a one-sample delay element 98 where the transfer function is 1/Z. The signal output from the one-sample delay element 98 is input to the above-described transfer element 92.

Note that the block diagram described above has conceptually shown the processing which is performed in the main control section 68. In fact, predetermined processing routine is executed in the MPU 32, based on the head position signal Y(N) input from the head position signal generating section 66. As a result, a signal equal to the output signal of the above-described summing point 74 is generated and output to a driver 34 as a motor current control signal u(n).

Figure 1:
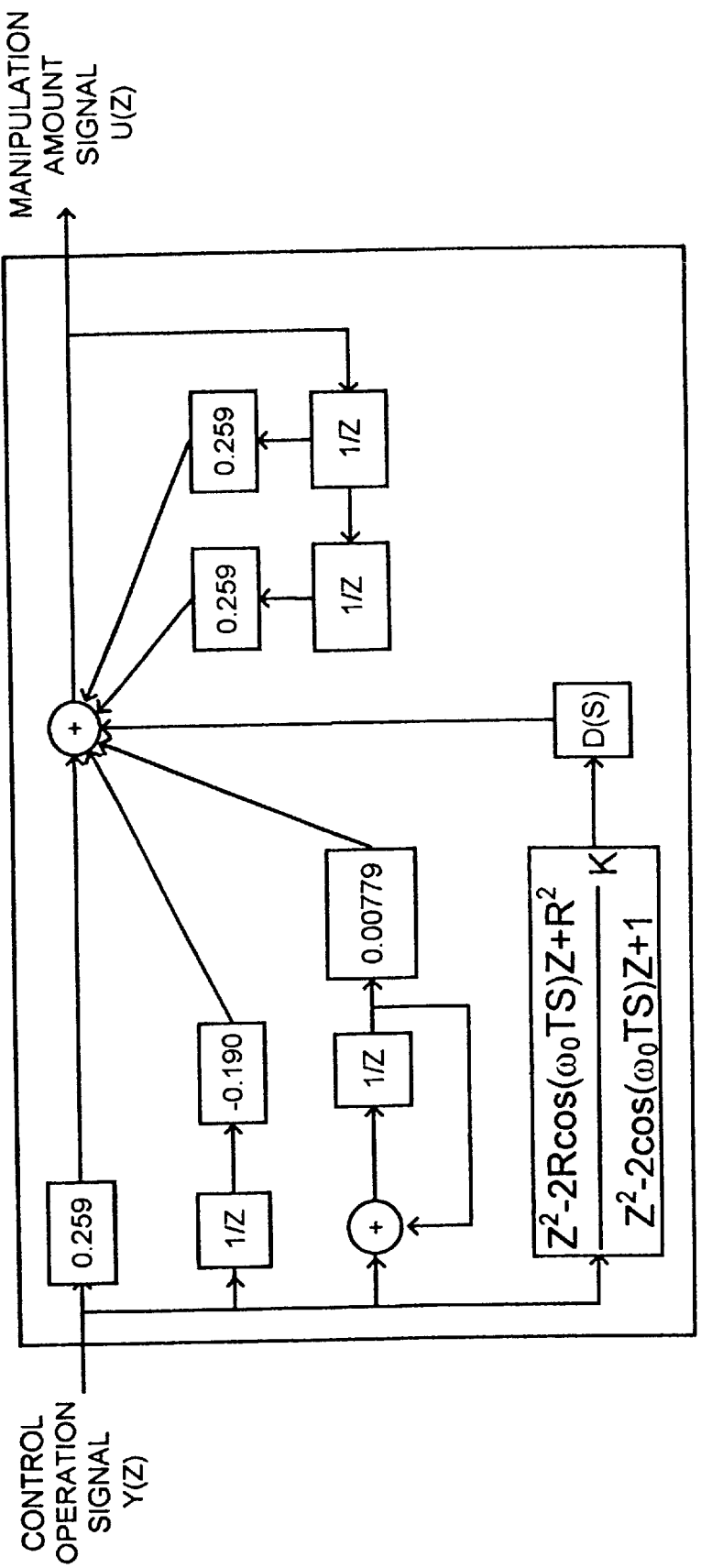
FIG. 1 is a block diagram conceptually showing an example of control elements according to the present invention.
Figure 2:
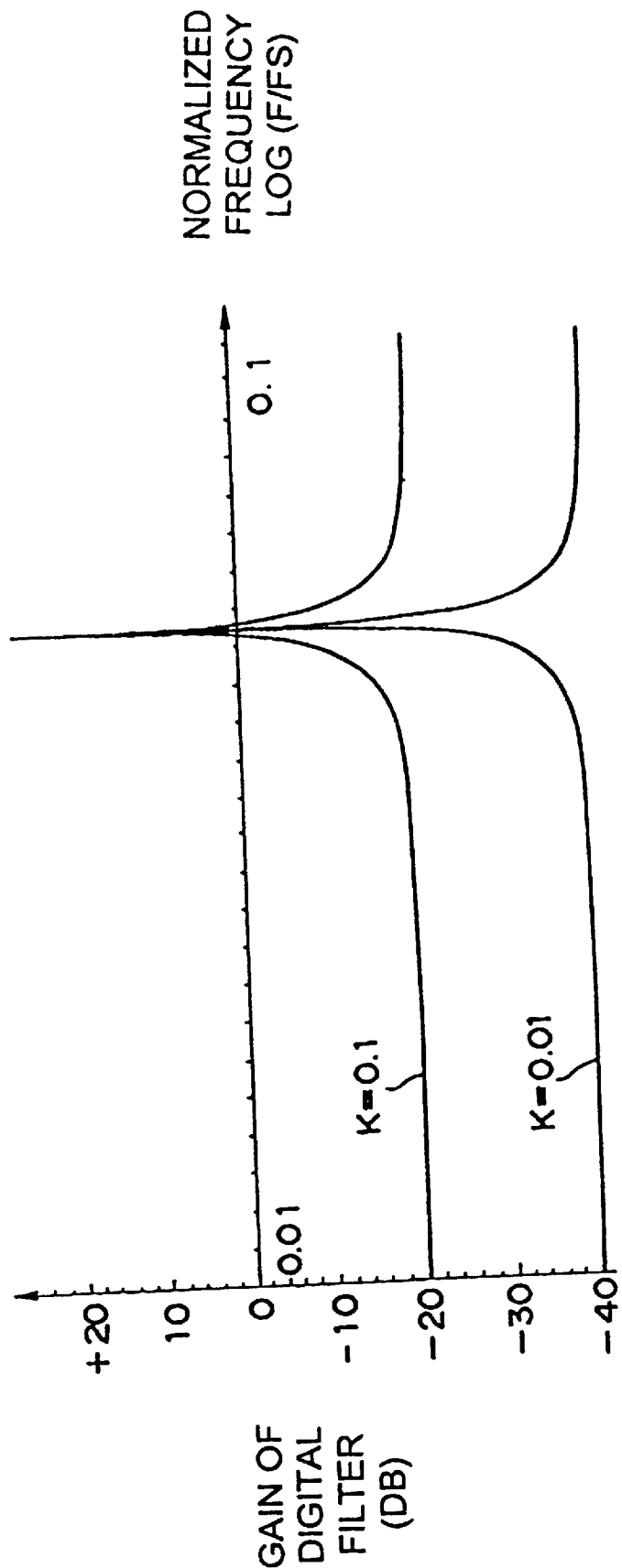
FIG. 2 is a diagram showing a change in the characteristic of a digital filter as a constant K is changed.
Figure 3:
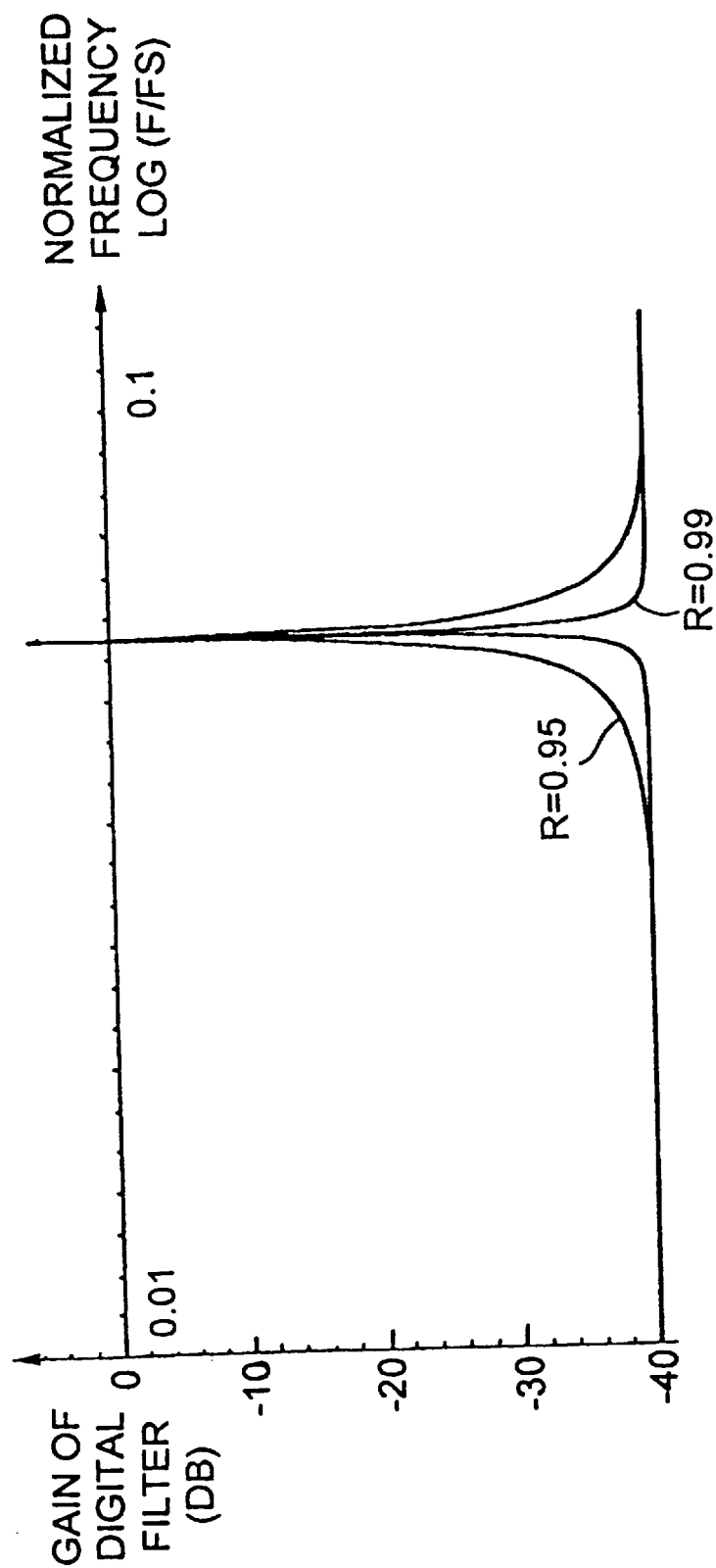
FIG. 3 is a diagram showing a change in the characteristic of a digital filter as a constant R is changed.
Figure 4:
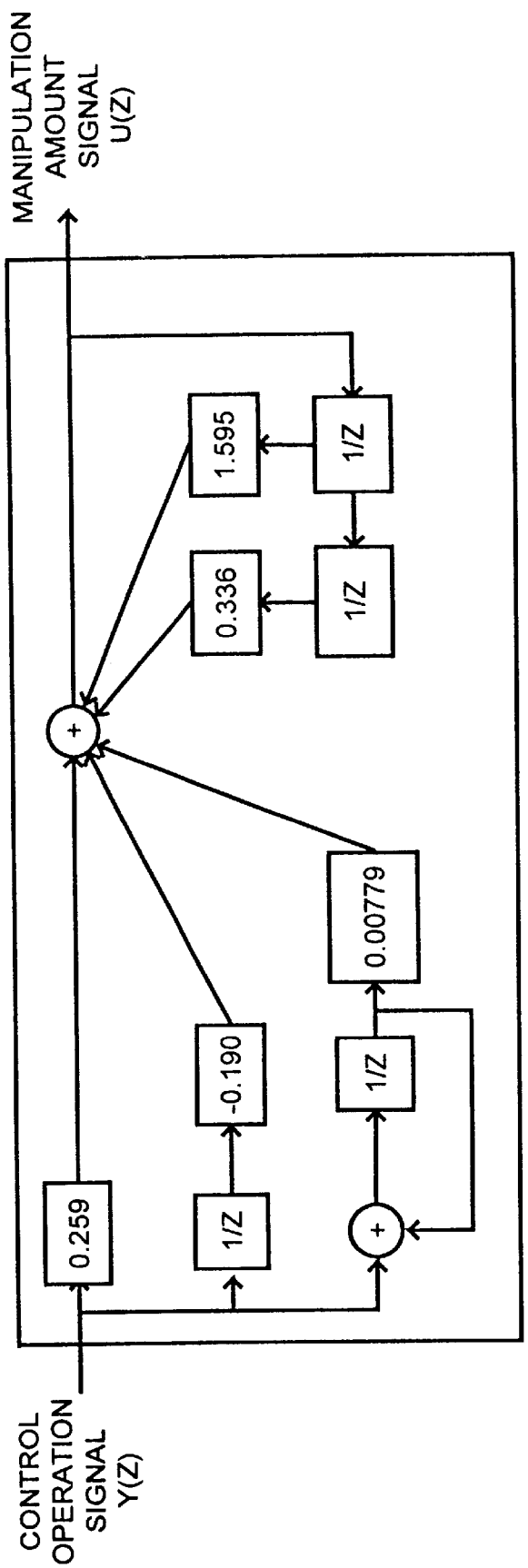
FIG. 4 is a block diagram conceptually showing an example of control elements for generating and outputting a manipulation-amount signal based on an input control operation signal, in the control system of a conventional magnetic disk drive, to explain the operation of the present invention.

If the block diagram of the main control section 68 shown in FIG. 12 is compared with the block diagram of the conventional main control section shown in FIG. 4, they are identical except that the digital filter 86 and the phase change section 88 have been added. Also, since the gain of the digital filter 86 is near 0 in areas other than a narrow band around a frequency of $F_o$, as shown in FIG. 3, the digital filter 86 has hardly an influence on an output corresponding to the frequency components other than the narrow band, among the frequency components which are included in the head position signal Y(N). Therefore, among the frequency components included in the head position signal Y(N) which is input to the main control section 68, the output with respect to the frequency components other than the narrow band is identical with that of the conventional disk drive. As a result, as with the prior art, the position of the magnetic head 20 can be controlled so that it is moved to its target position with a high degree of accuracy.

Also, in the conventional magnetic disk apparatus, even if the position of the magnetic head 20 could be controlled with a high degree of accuracy, in fact the deviation between the head target position and the head current position would periodically become a high value due to the above-described repetitive error, so the repetitive error is to be included in the component of the frequency $F_o$ of the head position signal Y(N) which is actually input to the main control section 68.

Figure 13:
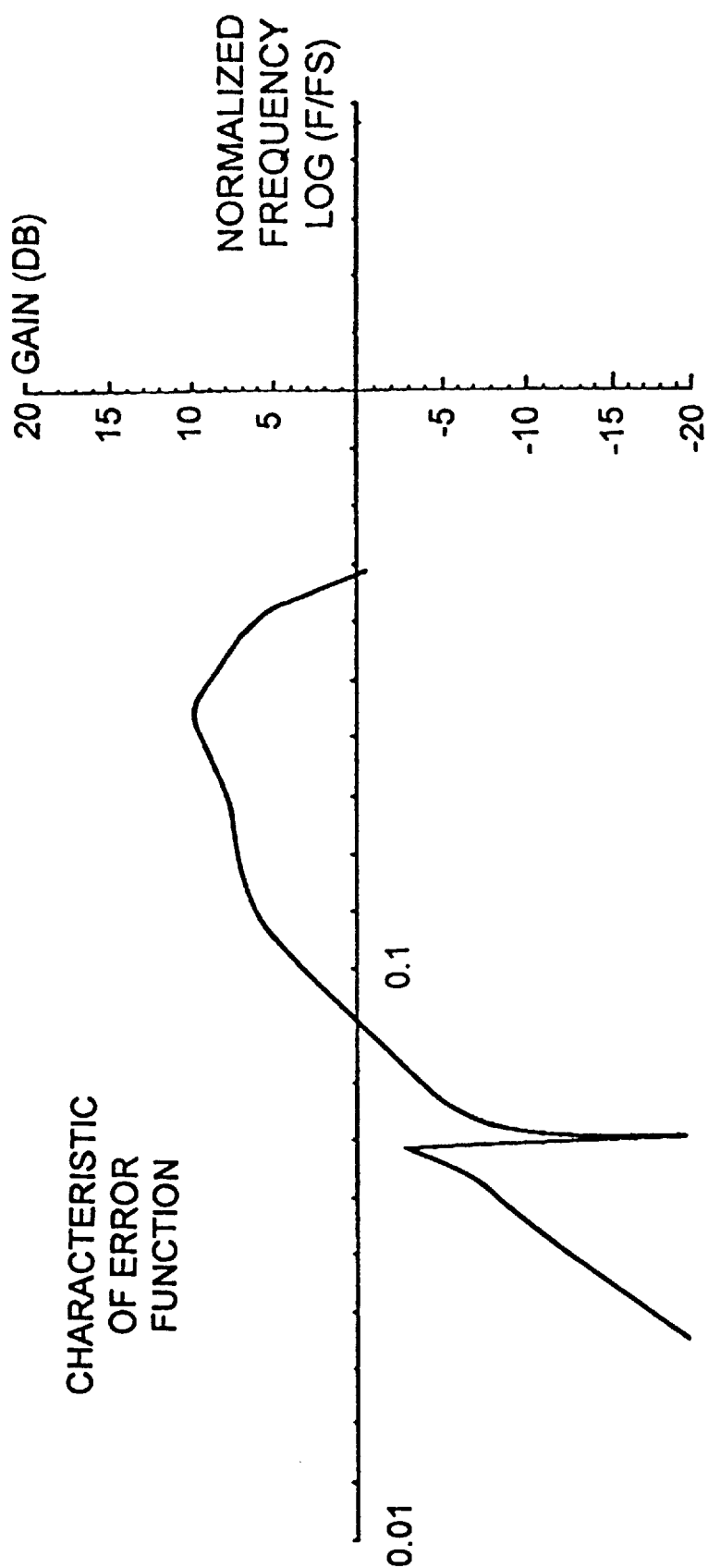
FIG. 13 is a graph showing the characteristic of an error function in the main control section.

On the other hand, in the embodiment of the present invention the gain of the digital filter 86 is very high with respect to the frequency component corresponding to the narrow band around the frequency $F_o$ of the head position signal Y(N), i.e., the frequency component corresponding to the frequency of the repetitive error. For this reason, since the gain in a position control system corresponding to the frequency $F_o$ (=200 Hz) has been made low in the characteristic diagram of the error function of the main control section 68 (which shows what degree an external disturbance of each frequency component could be reduced) shown in FIG. 13, there is no error which causes the position of the magnetic head 20 to be largely shifted from its target position with respect to an external disturbance (repetitive error) which occurs at a cycle corresponding to the frequency $F_o$. As a result, the position of the magnetic head 20 can be controlled with reliability so that the head position can match with the head target position.

Figure 5:
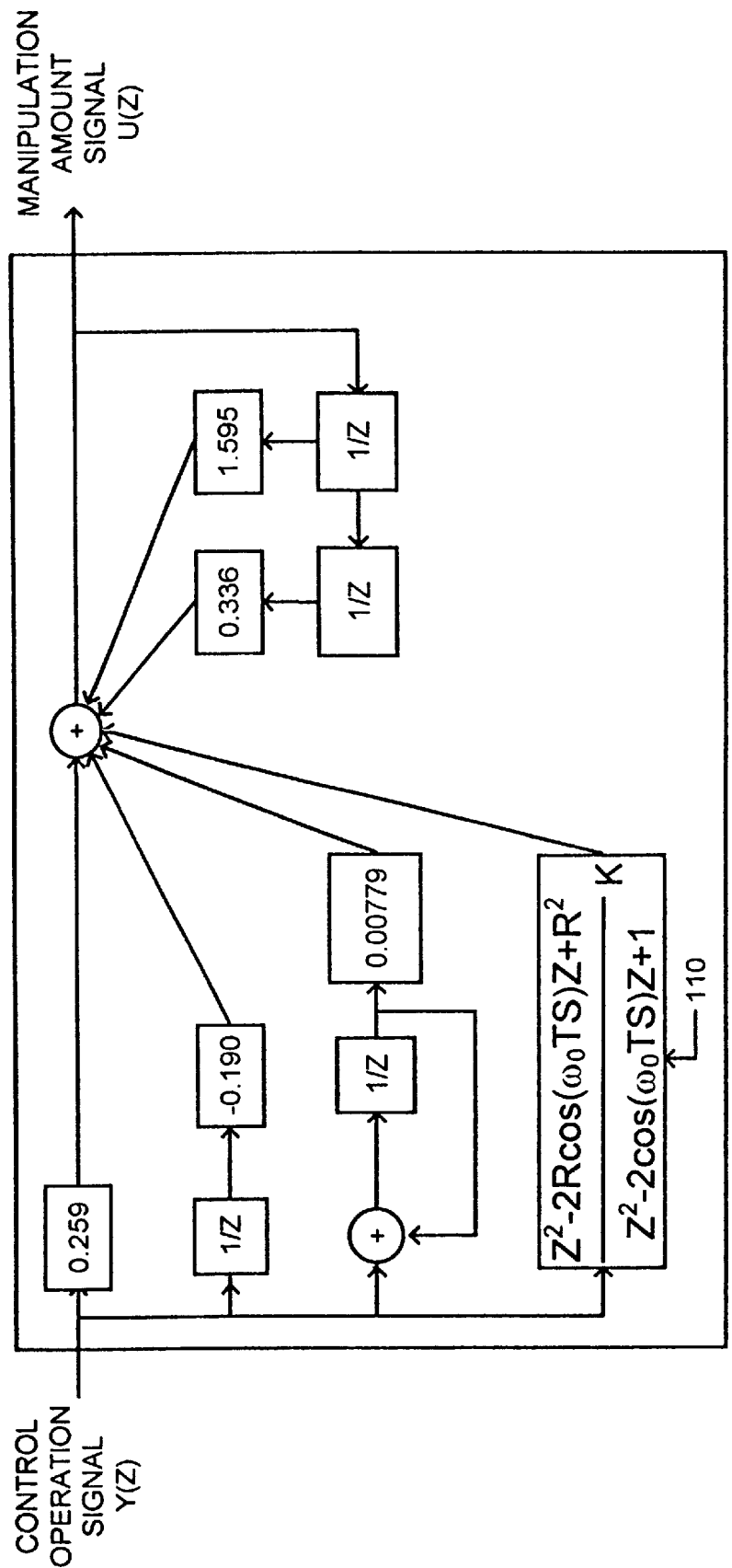
FIG. 5 is a block diagram conceptually showing control elements where a digital filter has been added to the control elements shown in FIG. 4.
Figure 6B:
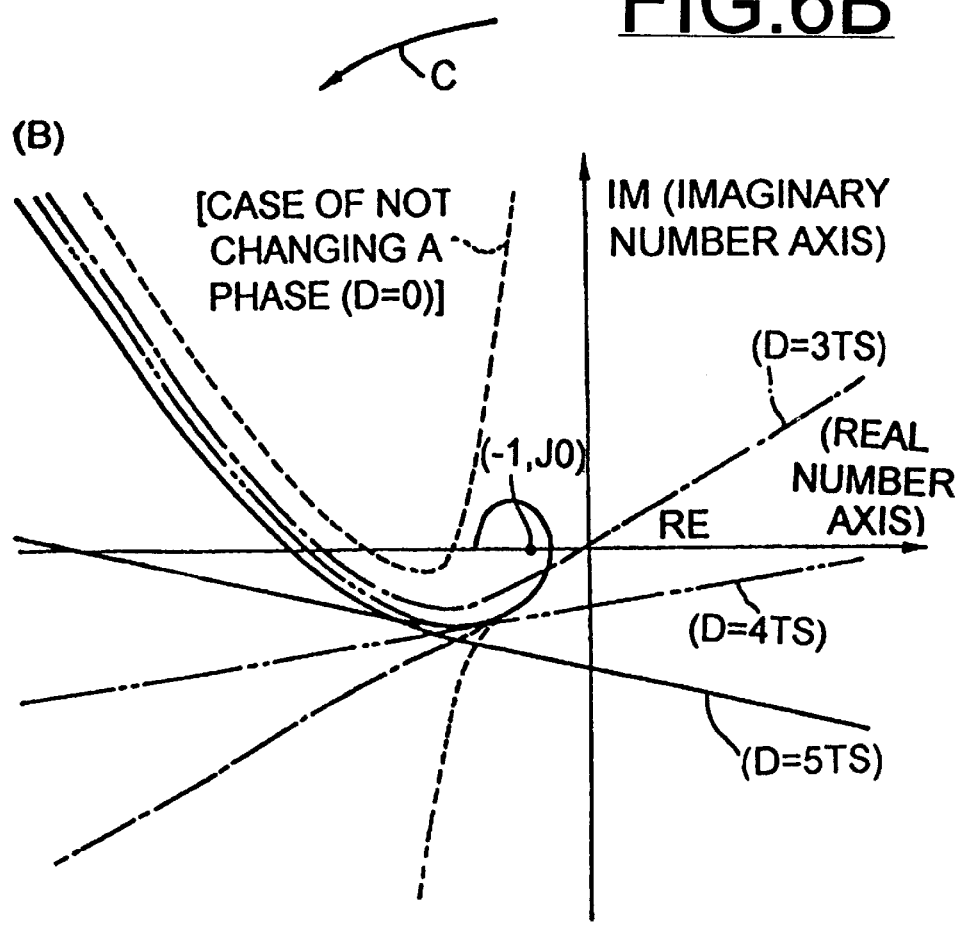
FIG. 6 at (A) is a Nyquist diagram obtained with the transfer function of a closed loop control system including the control elements of FIG. 4, and FIG. 6 at (B) is an enlarged Nyquist diagram in an area enclosed by two-dot chain line of FIG. 6 at (A), obtained with the transfer function of a closed loop control system including the control elements of FIGS. 5 and 1.
Figure 6A:
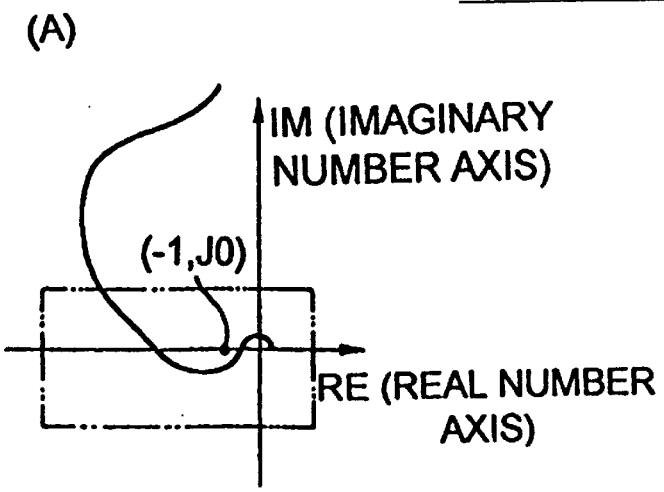

Also, in the embodiment of the present invention, since the delay time in Equation (4) representative of the transfer function of the phase change section 88 has been set to D=5·TS, the Nyquist diagram obtained with the transfer function of the entire closed loop control system including the main control section 68 matches with the locus shown by solid line (D=5·TS) in FIG. 6 at (B). In this locus, the point (−1, J0) on the complex plane of FIG. 6 at (B) is enclosed by an infinite circle, and the locus of the portion extending toward the infinite point and the locus of the portion returning from the infinite point are in positions spaced from the point (−1, J0), as compared with the locus indicated by one-dot chain line (D=3·TS) and the locus indicated by two-dot chain line (D=4·TS). Therefore, the stability of the closed loop system is not damaged unlike a case where the phase change section 88 is not provided (see FIG. 5), and the stability of the closed loop system becomes high as compared with the case of D=3·TS or 4·TS.

Figure 14:
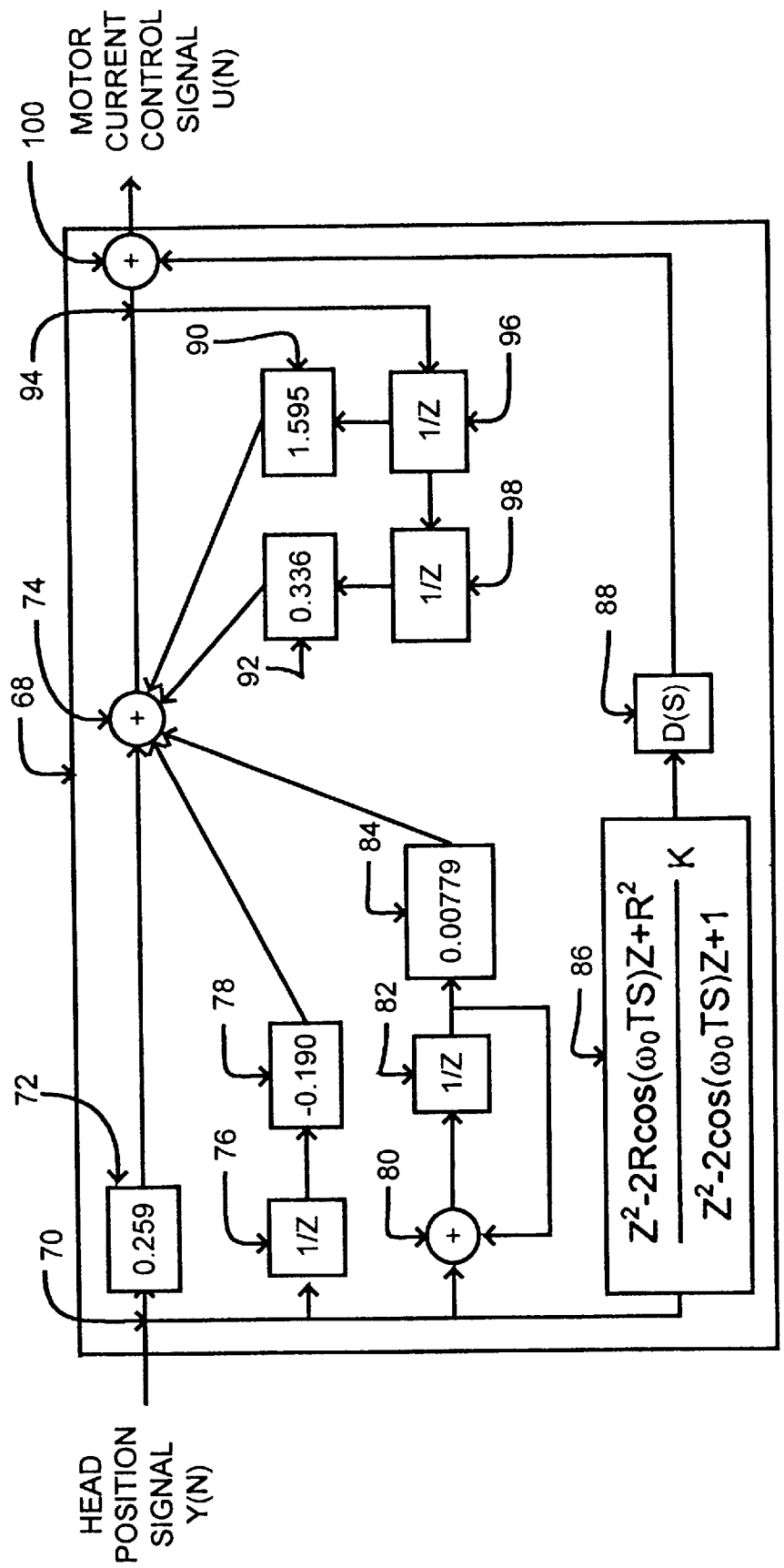
FIG. 14 is a block diagram showing another example of the main control section conceptually from the relationship between the input and output which are generated by the processing performed in the main control section.
Figure 15:
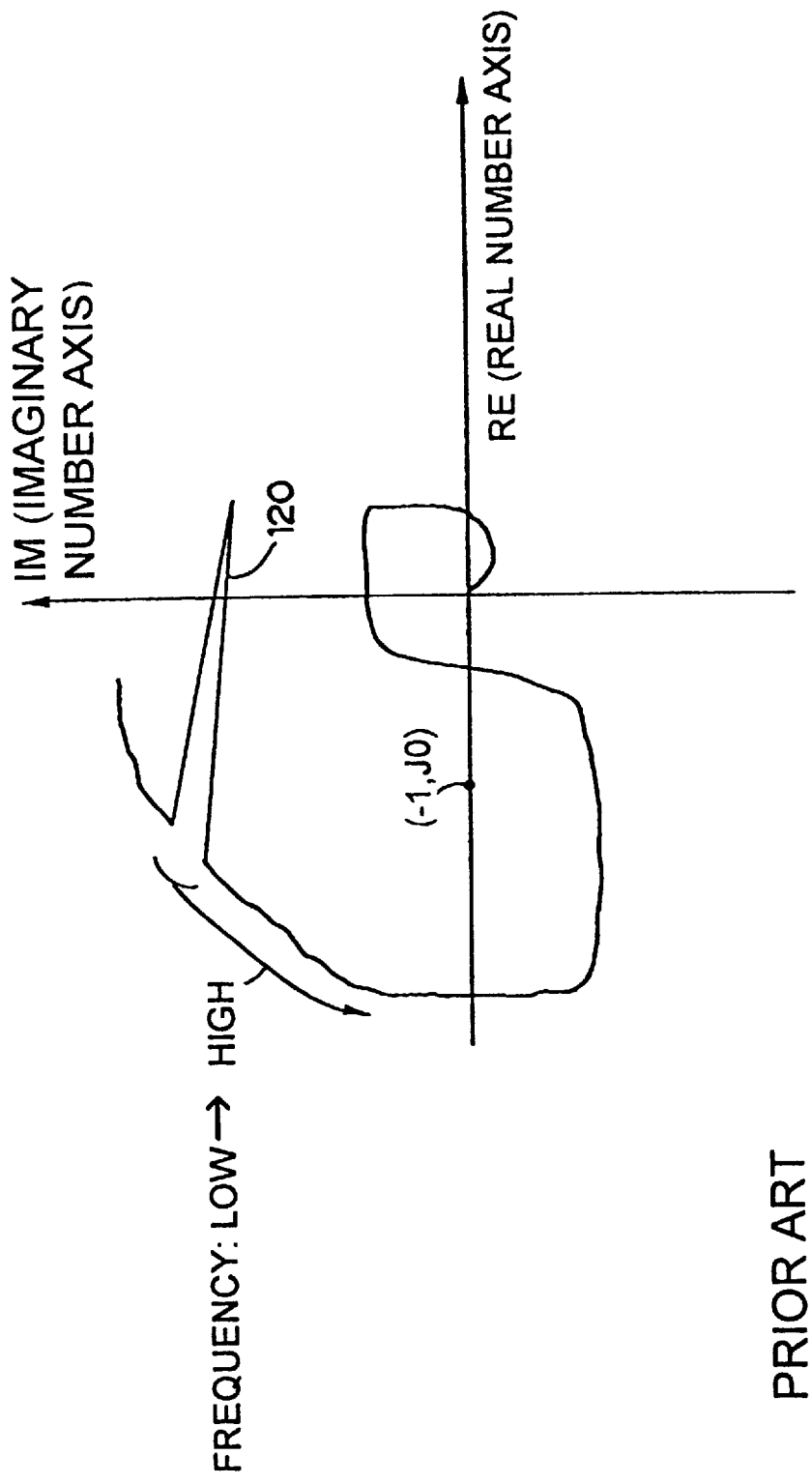
FIG. 15 is a Nyquist diagram obtained with the transfer function of a closed loop control system including control elements which includes a digital filter for generating and outputting a manipulation-amount signal based on an input control operation signal, in the control system of a conventional magnetic disk drive.

While it has been described in the above embodiment that the delay time, D, in the phase change section 88 is set to integer times a sampling cycle TS, the present invention is not limited to this. For example, the delay time D may be set to real number times a sampling cycle TS (for example, 4.5 times or 5.5 times). In this case, if the processing which is performed in the main control section 68 is conceptually shown with a block diagram from the relationship between the input and output which are generated by that processing, then it will become as shown in FIG. 14.

Only parts of FIG. 14 different from FIG. 12 will be described. A signal output from a summing point 74 is input to a summing point 100 through an outgoing point 94. A signal output from a phase change section 88 is also input to the summing point 100. From the summing point 100, a signal corresponding to the sum of the signal input from the summing point 74 and the signal input from the phase change section 88 is output as a motor current control signal U(N). Since a head position signal Y(N) is input to a main control section 68 at intervals of sampling time TS, the signal from the summing point 74 is also output at intervals of sampling time TS. However, in the arrangement of FIG. 14, the delay time D can be set to real number times a sampling cycle TS because the output signal from the phase change section 88 does not need to be output at the same time as the output signal of the summing point 74.

Also, while it has been described in the above embodiment that the head position signal Y(N) is input to the digital filter 86 and the phase of the signal output from the digital filter 86 is changed with the phase change section 88, it is a matter of course that the head position signal Y(N) may be input to the phase change section 88 and the head position signal Y(N) whose phase was changed with the phase change section 88 may be input to the digital filter 86.

Further, although it has been described in the above embodiment that the digital filter 86 whose transfer function is expressed by Equation (1) corresponds to the filter means of the present invention and the phase change section 88 whose transfer function is expressed by Equation (4) corresponds to the phase change means of the present invention, the filter means and the phase change means are not limited to Equations (1) and (4). The digital filter 86 and the filter equivalent to the phase change section 88 may be formed with filters having a transfer function different from Equations (1) and (4).

Also, although the magnetic disk of the hard-disk drive has been described as a rotating body according to the present invention, the invention is not limited to this magnetic disk. The present invention is applicable to data recording medium where a plurality of concentric circular tracks are formed, such as flexible magnetic disks other than hard magnetic disks, optical disks, or optical magnetic disks. The invention is also applicable to other rotating bodies. Thus, the present invention is applicable to a wide variety of head positioning controls where the head is positioned over a predetermined position on a rotating body.

[Advantages of the Invention]

As has been described hereinbefore, the position control apparatus according to the present invention comprises control means for controlling the movement of an object to be controlled by an actuator, by outputting a manipulation-amount signal for moving said object to a position corresponding to the target position, based on the control operation signal output from the control operation signal outputting section. The control means includes filter means where its gain becomes greater than a predetermined value only with respect to the component of a predetermined frequency included in the input control operation signal or the component of a frequency in a predetermined band including said predetermined frequency and becomes 0 or near 0 with respect to the components of frequencies other than said predetermined frequency or the components of frequencies other than said predetermined band, and also includes phase change means for changing a phase of a signal output from said filter means or a phase of said control operation signal which is input to said filter means. And, the control means is constructed so that output signals output from transfer elements comprising said filter means and phase change means are added to said manipulation-amount signal. Accordingly, the present invention has the advantage that the position of the object to be controlled can be reliably controlled without damaging the stability of a control system, even when the frequency of the repetitive error is high.

Also, the position control method according to the present invention comprises the steps of, based on a control operation signal, generating a manipulation-amount signal for moving said object to a position corresponding to the target position; inputting the control operation signal to filter means, the filter means having a gain which becomes greater than a predetermined value only with respect to the component of a predetermined frequency included in an input signal or the component of a frequency in a predetermined band including said predetermined frequency and which becomes 0 or near 0 with respect to the components of frequencies other than said predetermined frequency or the components of frequencies other than said predetermined band; changing a phase of a signal output from said filter means and adding the changed signal to the manipulation-amount signal, or changing a phase of the control operation signal, inputting the changed signal to said filter means, and adding the signal output to the filter means to the manipulation-amount signal; and controlling the movement of the object by an actuator, with said manipulation-amount signal. Accordingly, the present invention has the advantage that the position of the object to be controlled can be reliably controlled without damaging the stability of a control system, even when the frequency of the repetitive error is high.

While the present invention has been described with reference to the details of the embodiments of the invention shown in the drawing, these details are not intended to limit the scope of the invention as claimed in the appended claims.

I claim:

1. A position control apparatus comprising:

detecting means for detecting a current position of an object to be controlled that corresponds to a radial position of a rotating body;

signal outputting means responsive to said detecting means for receiving a target position of said object expressed in terms of the radial position of said rotating body and for outputting a control operation signal representative of a deviation between the current position detected by said detecting means and the input target position;

control means for controlling the movement of said object by an actuator, by generating and outputting a manipulation-amount signal for moving said object to a position corresponding to said target position, based on said control operation signal output from said signal outputting means;

wherein said control means includes filter means having a gain greater than a predetermined value only with respect to a component of a predetermined frequency included in the input control operation signal and said gain being zero or near zero with respect to the components of frequencies other than said predetermined frequency, and said control means includes phase change means for changing a phase of one of a signal output from said filter means and said control operation signal being input to said filter means; and said control means including means for adding output signals output from transfer elements comprising said filter means and phase change means to said manipulation-amount signal;

wherein said filter means is a filter where a transfer function H(Z) expressed by Z conversion is $$H(Z) = \frac{Z^2 - 2R \cdot \cos(\omega_0 TS)Z + R^2}{Z^2 - 2\cos(\omega_o TS)Z + 1} \cdot K \qquad \text{[Formula 1]}$$

where the detection cycle of the position of said object by said detecting means is TS and an angular frequency corresponding to said predetermined frequency is $\omega_o$, and R and K are constants, and wherein said phase change means is a filter where a transfer function D(S) expressed by Laplase transform is $$D(S)=e^{(-JDS)} \qquad \text{[Formula 2]}$$

where D is the delay time from an original system.

2. The position control apparatus as set forth in claim 1, wherein said rotating body is a data recording medium where a plurality of concentric circular tracks are formed and where data can be recorded on each track, and wherein said object to be controlled is a head which is provided with at least a function of reading out said data recorded on said tracks of said rotating body.

3. The position control apparatus as set forth in claim 1, wherein said data recording medium is a magnetic disk of a hard-disk drive and wherein said head is a magnetic head of said hard-disk drive which is provided with at least a function of reading out said data recorded on a track of said magnetic disk.

4. The position control apparatus as set forth in claim 1, wherein, on said rotating body, identification data for identifying the position of a head which is said object to be controlled is prestored along the radial direction, and said control operation signal outputting means detects the radial position of the rotating body that the head corresponds to, based on the identification data read out by said head.

5. The position control apparatus as set forth in claim 1, wherein said predetermined frequency is a frequency which is integer times a frequency corresponding to the cycle of rotation of the rotating body.

6. The position control apparatus as set forth in claim 1, wherein said predetermined frequency corresponds to a repetitive error frequency.

7. The position control apparatus as set forth in claim 1, wherein said component of said predetermined frequency included in the input control operation signal includes said component of a predetermined frequency band, said predetermined frequency band including said predetermined frequency.

8. The position control apparatus as set forth in claim 1, wherein said delay time D of said phase change means is set to a real number times said detection cycle TS.

9. A position control method comprising the steps of:

detecting a current position of an object to be controlled corresponding to a radial position of a rotating body;

generating a control operation signal representative of a deviation between the detected current position and a target position of said object expressed in terms of the radial position of said rotating body;

generating a manipulation-amount signal based on said control operation signal for moving said object to a position corresponding to said target position;

inputting said control operation signal to filter means, the filter means having a gain greater than a predetermined value only with respect to a component of a frequency in a predetermined band including a predetermined frequency included in an input signal and said gain being zero or near zero with respect to the components of frequencies other than said predetermined band;

changing a phase of one of said control operation signal and a signal output from said filter means, and responsive to changing a phase of said signal output from said filter means, adding the changed signal to said manipulation-amount signal, and responsive to changing a phase of said control operation signal, inputting the changed signal to said filter means, and adding the signal output to said filter means to said manipulation-amount signal;

controlling the movement of said object by an actuator, with said manipulation-amount signal; and wherein said step of inputting said control operation signal to filter means includes the step of providing said filter means with a digital filter having a transfer function H(Z) expressed by Z conversion of $$H(Z) = \frac{Z^2 - 2R \cdot \cos(\omega_o TS)Z + R^2}{Z^2 - 2\cos(\omega_o TS)Z + 1} \cdot K \qquad \text{[Formula 3]}$$

where the cycle of the detection cycle of the position of said object by said detecting means is TS and an angular frequency corresponding to said predetermined frequency is $\omega_o$, and R and K are constants, and wherein the change of the phase of one of the signal output from said filter means and said control operation signal is performed by a filter having a transfer function D(S) expressed by Laplase transform of $$D(S) = e^{(-JDS)} \qquad \text{[Formula 4]}$$

where D is the delay time from an original signal.

10. A position control apparatus for positioning a head relative to a rotating data recording medium in a disk storage device comprising:

detecting means for detecting a current position of the head corresponding to a radial position of the data recording medium;

means responsive to said detecting means for receiving a target position of the head expressed in terms of the radial position of the data recording medium and for outputting a control operation signal representative of a deviation between the current position detected by said detecting means and the input target position; and control means for controlling the movement of the head by an actuator, by generating and outputting a manipulation-amount signal for moving the head to a position corresponding to said target position, based on said control operation signal output from said signal outputting means; and wherein said control means includes filter means having a gain greater than a predetermined value only with respect to a component of a predetermined frequency included in the input control operation signal and said gain being zero or near zero with respect to the components of frequencies other than said predetermined frequency, and said control means includes phase change means for changing a phase of one of a signal output from said filter means and said control operation signal being input to said filter means;

said control means including means for adding output signals output from transfer elements comprising said filter means and phase change means to said manipulation-amount signal; and wherein said filter means is a filter where a transfer function H(Z) expressed by Z conversion is $$H(Z) = \frac{Z^2 - 2R \cdot \cos(\omega_o TS)Z + R^2}{Z^2 - 2\cos(\omega_o TS)Z + 1} \qquad \text{[Formula 1]}$$

where the detection cycle of the position of said object by said detecting means is TS and an angular frequency corresponding to said predetermined frequency is $\omega_o$, and R and K are constants, and wherein said phase change means is a filter where a transfer function D(S) expressed by Laplase transform is $$D(S) = e^{(-JDS)} \qquad \text{[Formula 2]}$$

where D is the delay time from an original system.

* * * * *

UNITED STATES PATENT AND TRADEMARK OFFICE
CERTIFICATE OF CORRECTION

PATENT NO. : 5,822,147
DATED : Oct. 13, 1998
INVENTOR(S) : Masashi Kisaka

It is certified that error appears in the above-identified patent and that said Letters Patent is hereby corrected as shown below:

Claim 10, Col. 18, Line 51 and 52, $$"\ H(Z) = \frac{Z^2 - 2R \cdot \cos(\omega_o TS)Z + R^2}{Z^2 - 2\cos(\omega_o TS)Z + 1}\ "$$

should be $$--\ H(Z) = \frac{Z^2 - 2R \cdot \cos(\omega_o TS)Z + R^2}{Z^2 - 2\cos(\omega_o TS)Z + 1} \cdot K\ --.$$

Signed and Sealed this

Twenty-sixth Day of January, 1999

Attest:

Attesting Officer

*Acting Commissioner of Patents and Trademarks*